US007246355B1

(12) United States Patent
Burianne

(10) Patent No.: US 7,246,355 B1
(45) Date of Patent: Jul. 17, 2007

(54) DEVICE AND METHOD FOR INITIALIZING AN APPLICATIVE PROGRAMME OF AN INTEGRATED CIRCUIT CARD

(75) Inventor: Yannick Burianne, Clamart (FR)

(73) Assignee: Axalto SA, Meudon (FR)

( * ) Notice: Subject to any disclaimer, the term of this patent is extended or adjusted under 35 U.S.C. 154(b) by 0 days.

(21) Appl. No.: 09/857,732

(22) PCT Filed: Dec. 8, 1999

(86) PCT No.: PCT/FR99/03065

§ 371 (c)(1),
(2), (4) Date: Aug. 13, 2001

(87) PCT Pub. No.: WO00/34927

PCT Pub. Date: Jun. 15, 2000

(30) Foreign Application Priority Data

Dec. 8, 1998 (FR) .................................. 98 15493

(51) Int. Cl.
*G06F 13/00* (2006.01)
*G06F 9/44* (2006.01)

(52) U.S. Cl. ...................................... 719/310; 717/121

(58) Field of Classification Search .................. 717/10, 717/121; 719/310
See application file for complete search history.

(56) References Cited

U.S. PATENT DOCUMENTS

| | | | | |
|---|---|---|---|---|
| 5,019,970 | A | 5/1991 | Yamaguchi et al. | 364/200 |
| 5,515,532 | A | 5/1996 | Iijima | 395/600 |
| 5,829,006 | A * | 10/1998 | Parvathaneny et al. | 707/101 |
| 5,913,218 | A * | 6/1999 | Carney et al. | 707/200 |
| 6,110,227 | A * | 8/2000 | Marcelais et al. | 717/170 |
| 6,708,181 | B1 * | 3/2004 | Peterson | 1/1 |
| 6,754,670 | B1 * | 6/2004 | Lindsay et al. | 707/100 |

FOREIGN PATENT DOCUMENTS

| | | |
|---|---|---|
| EP | 0540095 A1 | 5/1993 |
| EP | 0 674 290 A2 | 9/1995 |
| FR | 2 759 795 | 8/1998 |

* cited by examiner

*Primary Examiner*—William Thomson
*Assistant Examiner*—LeChi Truong
(74) *Attorney, Agent, or Firm*—Osha Liang LLP

(57) ABSTRACT

This invention relates to an integrated circuit device comprising a memory and at least one application program residing within said memory. This invention is characterized in that the application program comprises at least one configurable variable and a list of at least one reference element, and in that said memory includes, on the one hand, at least one means for initializing said variables, wherein said means is configured with several parameters, one of which parameters is said reference element list, and on the other hand, a command for sending data that contain, in particular, values to be assigned to the configurable variables. This invention can be applied, in particular, to smart cards.

8 Claims, 3 Drawing Sheets

A
12
APPLICATION
R
L
V
MI
INITIALIZATION MEANS
COMMAND
CDE

CDE
| CLASS | INS | MODE | NUMBER OF ELEMENTS TO BE CONFIGURED | TOTAL DATA LENGTH | INDEX | VALUE LENGTH | VALUES |
|---|---|---|---|---|---|---|---|
| CLASS | INS | IN | 3 | 47 | 1 | 15 | GSM APPLICATION |
| | | | | | 2 | 10 | DIAL |
| | | | | | 3 | 14 | CALLING |
DATA
*FIG. 4*
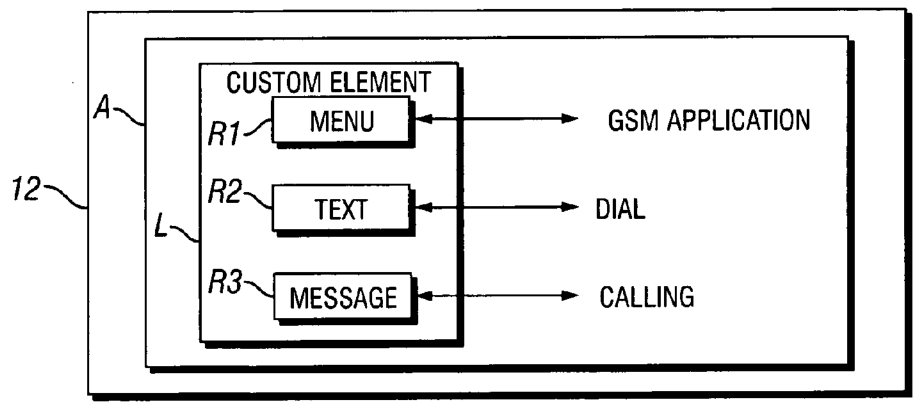
*FIG. 5*
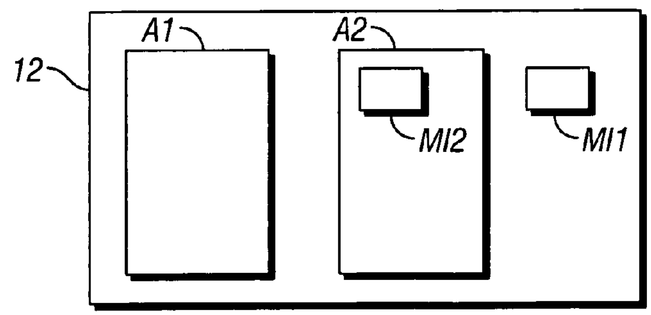
*FIG. 6*

DEVICE AND METHOD FOR INITIALIZING AN APPLICATIVE PROGRAMME OF AN INTEGRATED CIRCUIT CARD

FIELD OF THE INVENTION

This invention relates to an integrated circuit device comprising a memory and at least one application software residing in the memory. It also relates to a method for initializing an application program in such a device.

BACKGROUND OF INVENTION

These devices are, in particular, portable items such as smart cards having application programs relating to the fields of health, mobile telephony, as well as banking transactions.

Such smart cards comprise a card body into which an electronic unit is integrated, which contains, in a conventional way, a control unit (such as a central processing unit or CPU) and a memory. This memory comprises at least one application program containing unitary elements which are assigned values so that the program can be executed, wherein these elements are not modified when the application program is executed. These elements are referred to as configurable variables.

In view of configuring said variables, the state of the art provides devices that use files containing data assigned to variables in a so-called initialization phase. This initialization phase is necessary for a proper execution of the application program. In order to do so, these devices comprise control means for modifying the values of initialization data within said files and then assigning these data to said variables. When the variables are permanently stored within the memory, they maintain their initial value even if the card is no longer powered.

Although these devices allow an application program to be configured, the initialization values are duplicated within two memory spaces having substantially identical sizes, one of which contains the initialization data files and the other being the memory space allocated to variables which are initialized with said data, which can be problematic because of the limited available memory of smart cards. Moreover, the execution time of such application program is substantially increased, in particular due to the requirement to perform the initialization phase on every execution of the program even if the initialization values have not changed, as the initialization phase is an integral part of the application program. Finally, there are cases where either the application program has no privilege for file access, or the card simply has no file associated with it.

SUMMARY OF THE INVENTION

Therefore, a technical problem to be solved according to the present invention is to provide a device having an integrated circuit comprising a memory and at least one application program residing within said memory, and a method for initializing an application program in such a device, which would allow, on the one hand, to configure an application program without having to duplicate data and thus avoiding memory space losses due to the above-mentioned files, and on the other hand, to avoid increasing the execution time of said application program.

According to the present invention, a solution to the technical problem posed is such that said application program comprises at least one configurable variable and a list of at least one reference element, in that said memory includes, on the one hand, at least one means for initializing said variables, wherein said means is set-up with several parameters, one of which is the reference element list, and on the other hand, a command for sending data specifically containing values to be assigned to the configurable variables.

According to a second object of the present invention, this solution is characterized in that the initialization method includes the steps of:

generating, within said application program, at least one configurable variable and a list of at least one reference element, sending data specifically containing values to be assigned to the configurable variables, initializing said variables through the use of one initializing means, wherein said means is set-up with several parameters, one of which parameters is the reference element list.

Thus, as shown in detail below, the device according to the invention enables optimal management of the card memory and direct configuration of the variables in an application program by using the command for modifying the values assigned to the configurable variables and also, by using the reference element list passed as a parameter to the initialization means, which list allows a link to be established between the values sent by the command and the variables in the application program to be configured.

Other features and advantages of the invention will become apparent in the following description of the invention disclosed by way of non-limiting examples in reference to the appended figures.

BRIEF DESCRIPTION OF THE DRAWINGS

FIG. 4 is a schematic diagram of a command in the card of FIG. 1.

FIG. 5 is a schematic diagram of an element list in an application program in the memory of FIG. 2.

FIG. 6 is another schematic diagram of the memory in the card of FIG. 1.

DETAILED DESCRIPTION

Figure 1:
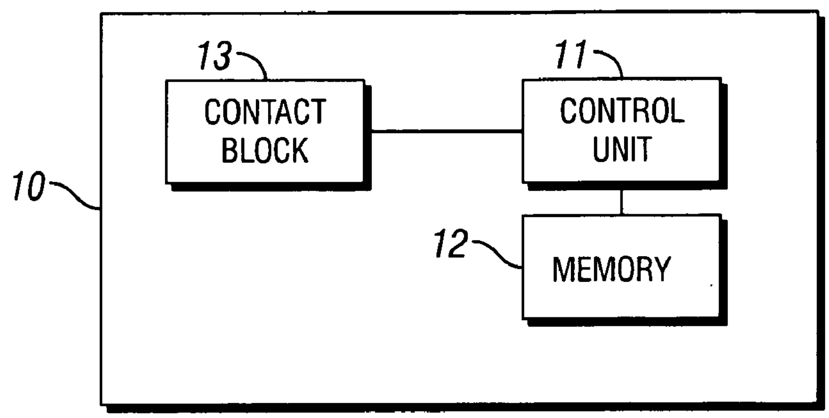
FIG. 1 is a schematic diagram of an integrated circuit device, here a smart card.

In FIG. 1, there is shown an integrated device 10, here a smart card.

Card 10 contains a control unit 11 (for example a central processing unit or CPU), a memory 12 and a contact block 13 for electrical connection, for example, to a card reader connector.

Figure 2:
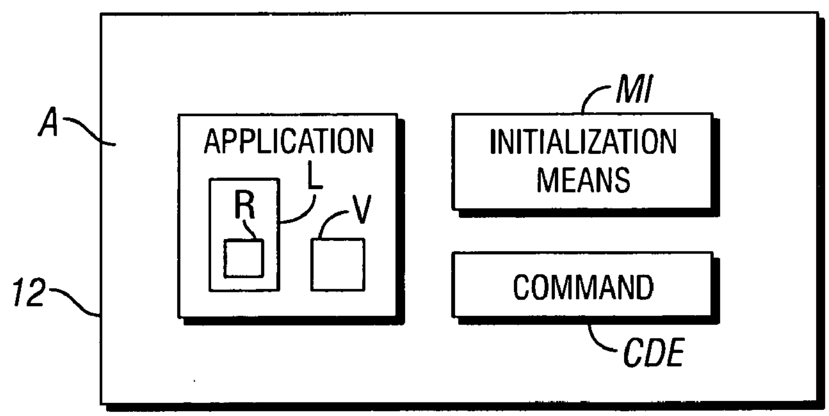
FIG. 2 is a schematic diagram of a memory in the card of FIG. 1.
Figure 3:
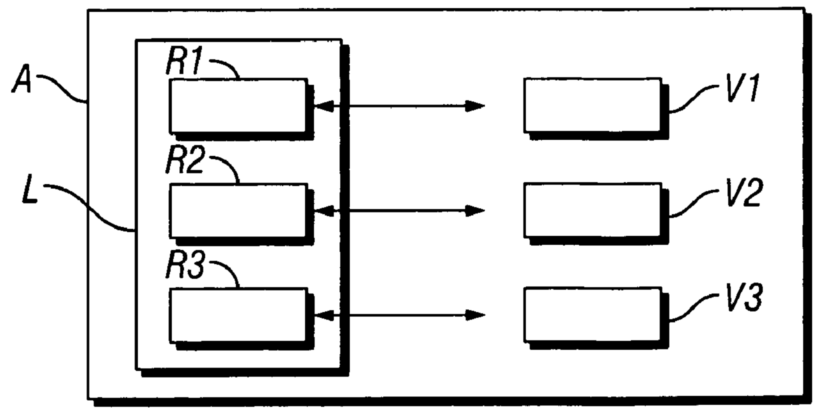
FIG. 3 is a schematic diagram of an application program in the card of FIG. 1.

Memory 12 is shown in FIG. 2. It contains an application program A. Program A comprises at least one configurable variable V and a list L of at least one reference element R. The memory comprises, on the one hand, at least one initialization means MI for said variables V, said means being set-up with several parameters, one of which parameters is list L of reference elements, and, on the other hand, a command CDE for sending data specifically containing values to be assigned to the configurable variables. Means MI is implemented as a function or a piece of software. In FIG. 3, application program A has three configurable variables V1, V2 and V3 and one list L that contains three reference elements R1, R2 and R3.

So that program A proceeds properly, its variables have to be configured, that is, they must be assigned values.

In a first step, command CDE is sent to card 10. It contains data, such as a number of reference elements R, numbers indexing reference elements in a list, associated values, and the like. In FIG. 4, command CDE sends the three following alphanumerical values: GSM APPLICATION, DIAL and CALLING. These values are preceded with indexes 1, 2 and 3 which correspond to three reference elements.

When application program A receives command CDE, it is executed, so that the initialization phase that invokes means MI is thus started.

In a second step, a link is built between the values sent by command CDE and reference elements of a specific list L. Reference element list L, which configures initialization means MI, allows this link to be established. Other parameters are, inter alia, data sent by command CDE. List L is specified, for example, by providing its name. In FIG. 5, L is called CUSTOMELEMENT. It contains three reference elements, MENU, TEXT and MESSAGE, to which are associated the alphanumerical values GSM APPLICATION, DIAL and CALLING, respectively. These values originate from command CDE.

In a third step, initialization means MI establish a link between the values of list L and variables V to be configured, by means of reference elements R. In order to do so, a reference element R references a configurable variable V. In FIG. 3, R1, R2 and R3 refer to variables V1, V2 and V3, respectively, the latter being variables whose contents have to be initialized totally or partially. It is by using these different links that the values are transferred to said variables.

Once the transfer has been performed, the configuration of application program A is completed and the rest of the program can proceed as desired. The device according to this invention has no file and therefore the variables have been directly configured.

It should be noted that, according to the invention, command CDE also enables reading the configurable variable contents, because the command includes a parameter referred to as MODE, which indicates whether the command should send or read data. Accordingly, the values of variables V can be read at any time, so that, the configuration of application program A can be known at all time.

It may be useful, for saving memory space and making initialization more consistent, to enable one or more application programs to use the same initialization means MI. Thus, at least one initialization means MI resides within the memory, irrespective of application program A. As a consequence, means MI can be used by any application program residing on card 10 and is not specific to any particular program A. As shown in FIG. 6, means MI1 is independent of application programs A1 and A2 and can therefore be used by either one of these programs.

It may also be useful, however, to enable customization of the initialization means for a given application program by providing means other than MI1, for example in the case where it is desired to have a data exchange protocol other than the one used in MI1, namely by using a different initialization data format. As shown in FIG. 6, at least one application program A2 comprises initializing means MI2. For configuring variables in A2, it will be possible to use either of means MI1 and MI2 if the variables comply with the respective data format of said means.

It should also be noted that it is possible to avoid using means MI independent of any application program, in which case each initialization means MI is assigned to a given application program or, on the contrary, to use only independent means.

More specifically, the present invention can be applied to application programs that are programmed with high level languages such as, in particular, the so-called JAVA language (registered trade name). This language is based on the concepts of class, inheritance, attribute, and method, that are well known to those skilled in the art.

Figure 7:
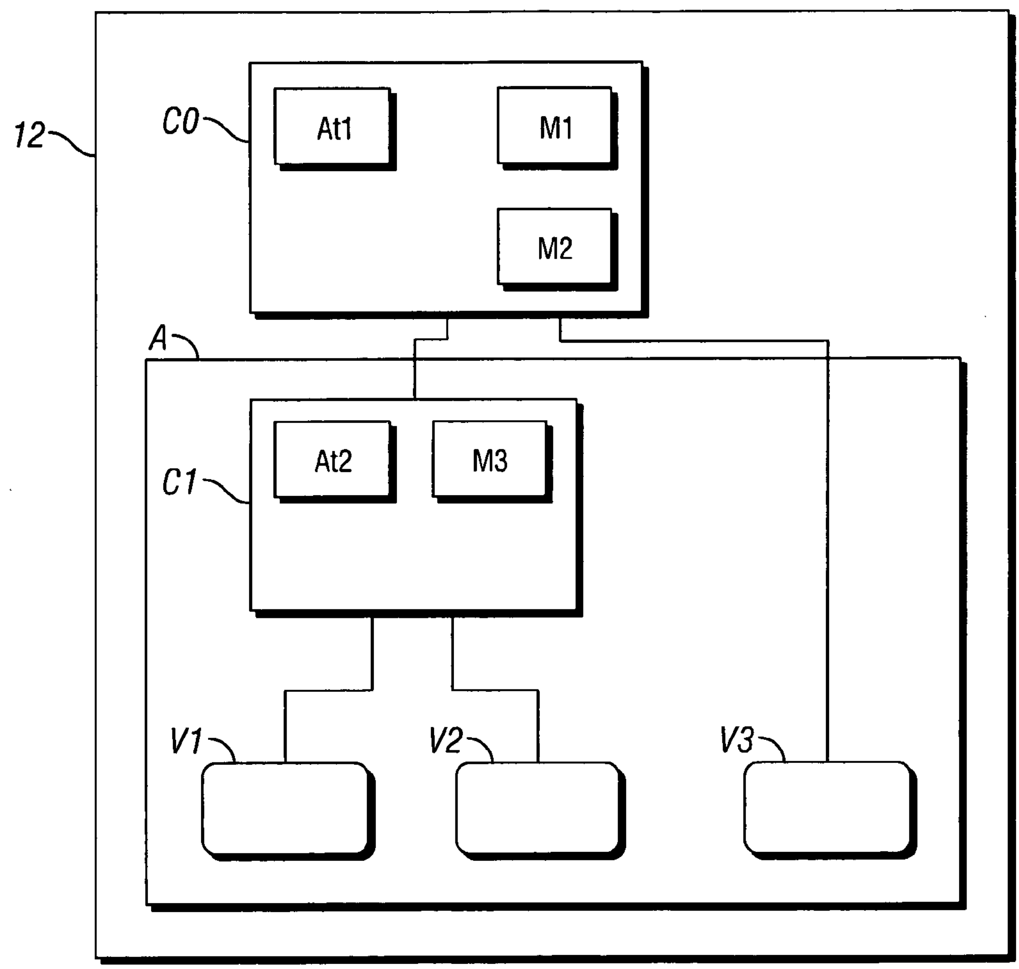
FIG. 7 is a schematic diagram showing the variables contained in the application program of FIG. 3.

In the case where application program A is written in JAVA, the configurable variables are objects and a list of reference elements refers to a set of objects. In FIG. 7, memory 12 comprises an application program A. Application program A has at least two configurable variables V1 and V3 referenced in the same list, which derives from the same parent class C0. In addition, said application program A has at least two configurable variables V1 and V2 referred to in the same list, that are instances of the same class C1. The various classes are defined either in application program A, or independently from each other, for example, within a library. The configurable variables are persistent within memory 12.

It can be noted that list L represents objects having either common features, in which case variables or objects V1 and V3 inherit attribute At1 and methods M1 and M2 from class C0 but have their own attributes and methods, or share all of their features in common, in which case V1 and V2 are instances of the same class C1 which has attributes At2 and method M3. In order to configure these objects, a list L should be of the same type as a parent of the class these objets belong to. Thus, means MI1 alone will allow part of contents of objects V1, V2 and V3 to be configured, namely attribute At1. It is also possible to provide other more complex means MI2 for configuring the set of attributes At1 and At2 of variables V1 and V2.

Based on the definition on the type of list L, the present invention enables modifying values of clearly specified object attributes and thus prevent other objects contents from being inadvertently changed. In addition, according to the present invention, the memory location that contains all of the variables in application program A is not directly accessed so that there is no risk that all of those variables might be fraudulently modified.

Another advantage of the present invention is that these variables or objects are persistent within the memory. This means that once they have been configured and if they have not been modified during application program A execution, said objects maintain their initial values even after program A execution. If it is not desired to modify these values before another execution of A, the user does not need to send command CDE for configuring application program A. As a consequence, the initialization phase is no longer required and no initialization means MI needs to be triggered. Therefore, the execution time is reduced.

As described above, JAVA language is attractive in several respects, but one of its most powerful features is that is includes security means, some of which check that each instruction in an application program A as well as its parameters, are valid. For example, if an instruction requires a byte table located at a given address within memory 12 as a parameter, whereas a forbidden memory address is specified instead, the security means will allow this error to be detected and thus prevent forbidden memory access. In order to take advantage of these verification security means, according to the present invention, initialization means MI is defined in the same language as application program A, i.e. in JAVA. Therefore, if one of the parameters to means MI is erroneous, the program will not be executed and a counterfeiter will not be able to access forbidden memory locations.

The invention claimed is:

1. An integrated circuit portable device comprising a memory and at least one application program residing within said memory, characterized in that:

the at least one application program comprises at least one configurable variable and a list of at least one reference element that references the at least one configurable variable, and the memory includes at least one initializing means for initializing said at least one configurable variable, upon receipt, by the at least one application program, of a command that comprises at least one indexing data that indexes said at least one reference element in the list, and at least one associated configuring value to be assigned to the at least one configurable variable which is referenced by the at least one reference element as indexed by the said indexing data in the command, the at least one initializing means initiates linking between the at least one associated configuring value and the at least one reference element, wherein the initializing means, after the link has been established, transfers the at least one associated configuring value to the at least one configurable variable using the at least one reference element, and wherein the at least one configuring variable is used to configure the at least one application program.

2. An integrated circuit portable device according to claim 1, wherein said at least one configurable variable is persistent within said memory.

3. An integrated circuit portable device according to claim 1, wherein said at least one application program comprises at least two configurable variables that are referenced in the list and wherein said at least two configurable variables are derived from a common parent class.

4. An integrated circuit portable device according to claim 1, wherein said at least one application program comprises at least two configurable variables that are referenced in the list and wherein said at least two configurable variables are instances of a common class.

5. An integrated circuit portable device according to claim 1, wherein said at least one application program comprises the initialization means.

6. An integrated circuit portable device according to claim 1, wherein the initialization means and said at least one application program are written in the same programming language.

7. An integrated circuit portable device according to claim 1, wherein said command is further configured to enable reading of said at least one configurable variable.

8. A method for initializing an application program in an integrated circuit portable device comprising a memory and at least one application program residing within said memory, characterized in that said method includes the steps of:

providing the at least one application program with at least one configurable variable and a list of at least one reference element wherein the at least one reference element references the at least one configurable variable, sending a command to the at least one application program, the command comprising at least one indexing data that indexes said at least one reference element in the list and at least one associated configuring value to be assigned to the at least one configurable variable, establishing a link between the at least one associated configuring value and the at least one reference element, and transferring, after the link has been established, the at least one associated configuring value to the at least one configurable variable using the at least one reference element, wherein the at least one configuring variable is used to configure the at least one application program.

* * * * *